United States Patent [19]

Edelsohn et al.

[11] Patent Number: 4,990,925
[45] Date of Patent: Feb. 5, 1991

[54] INTERFEROMETRIC RADIOMETER

[75] Inventors: Charles R. Edelsohn; Carl A. Wiley, both of Los Angeles, Calif.

[73] Assignee: Hughes Aircraft Company, Los Angeles, Calif.

[21] Appl. No.: 607,848

[22] Filed: May 7, 1984

[51] Int. Cl.$^5$ .............................................. G01S 5/02
[52] U.S. Cl. ...................... 342/424; 382/42; 342/190
[58] Field of Search ............ 343/424, 5 CM, 5 MM, 343/400, 401, 442, 449; 382/42, 43; 342/400, 401, 442, 449, 424, 64, 190, 191

[56] References Cited

U.S. PATENT DOCUMENTS

| | | | |
|---|---|---|---|
| 3,808,596 | 4/1974 | Kazel | 343/5 CM X |
| 3,952,299 | 4/1976 | Hodge et al. | 382/42 X |
| 4,149,248 | 4/1979 | Pavkovich | 382/42 X |
| 4,164,788 | 8/1979 | Jain | 382/43 |
| 4,209,780 | 6/1980 | Fenimore et al. | 382/42 |
| 4,213,131 | 7/1980 | Kaiser, Jr. | 343/424 X |
| 4,228,420 | 10/1980 | Fenimore et al. | 382/42 X |
| 4,322,808 | 3/1982 | Weiss | 382/42 |
| 4,368,469 | 1/1983 | Ott et al. | 343/424 X |
| 4,389,633 | 6/1983 | Fenimore | 382/42 X |
| 4,449,193 | 5/1984 | Tournois | 382/42 X |
| 4,466,067 | 8/1984 | Fontana | 343/424 X |

OTHER PUBLICATIONS

G-AP-International Symposium, 22-24 Aug. 1973, University of Colorado, Boulder, Colorado, (U.S.) K. Hilty: "Broadband Correlation Sweep Interferometer", pp. 53-56.
Proceedings of the IEE, vol. 61, nr. 9, 1973, J. R. Coe: "NRAO Interferometer Electronics", pp. 1335-1339, see p. 1335, Figure 1.

Primary Examiner—Nelson Moskowitz
Assistant Examiner—John B. Sotomayor
Attorney, Agent, or Firm—S. M. Mitchell; M. J. Meltzer; A. W. Karambelas

[57] ABSTRACT

A radiometer (100) uses the fringe pattern of an interferometer (110) to scan a scene to produce a time record from which a high-resolution radio frequency, or other radiation, distribution of the scene can be reconstructed. A matched filter (120), or other means, transforms the time record according to a function of a signature of the determinable scanning motion relative to the fringe pattern.

For many applications, the modulation transfer function (123) of an included matched filter is the complex conjugate of the Fourier transform of the signature that would be produced by a constant point emitter scanned by the lobes of the interferometer fringe pattern.

Two-dimensional reconstructions may be provided for by multiple scans at different orientations. Alternatively, frequency scanning or another scanning technique can provide resolution orthogonal to the fringe pattern scanning motion. Focused distributions of multiple scenes and complex scanning motions are provided by appropriate selections of one or more signatures to process a given time record.

13 Claims, 7 Drawing Sheets

Fig. 3.
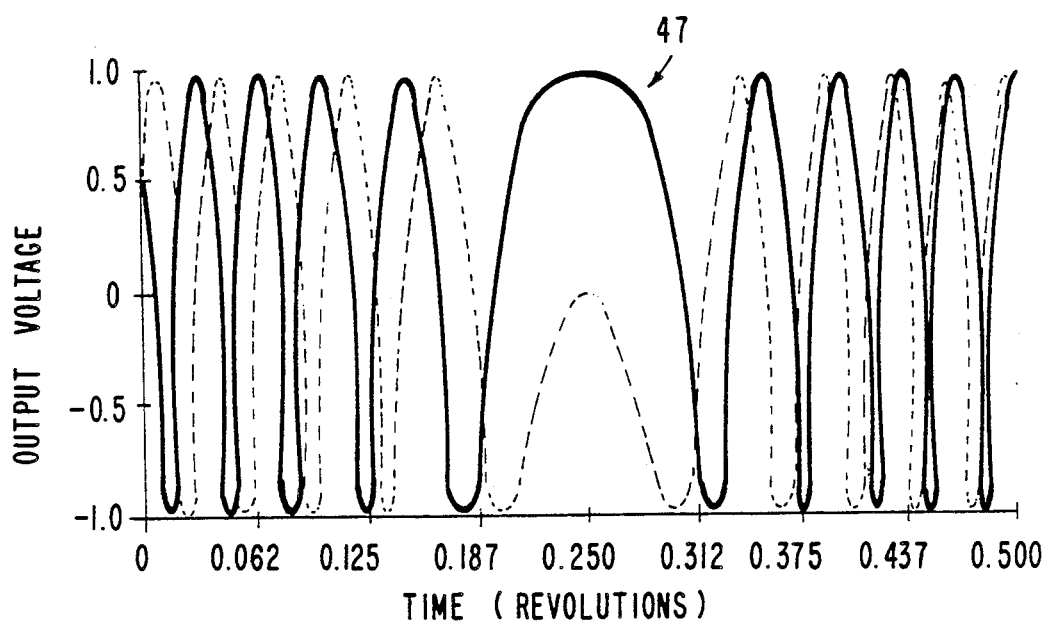
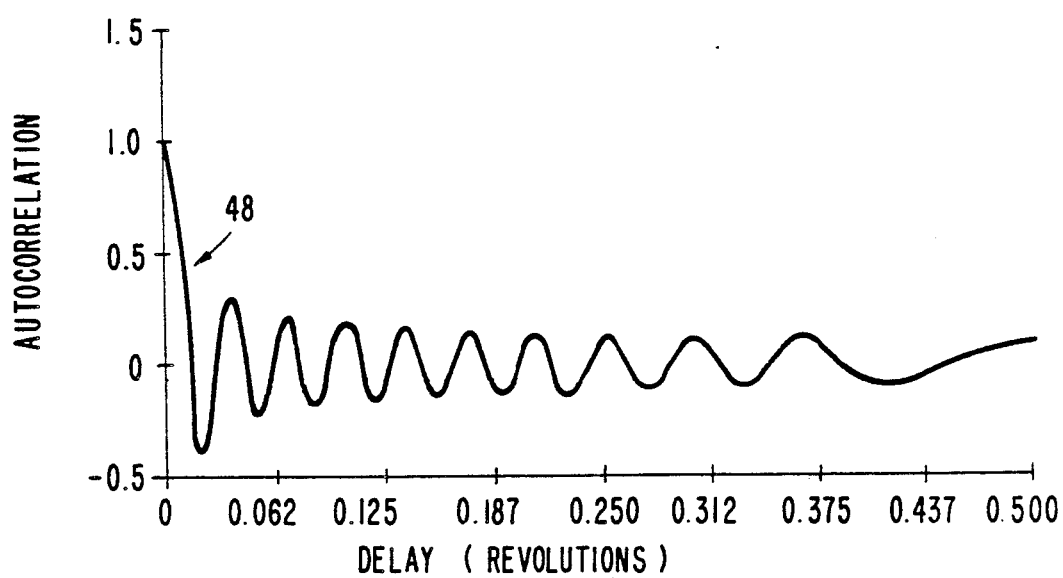
Fig. 4.

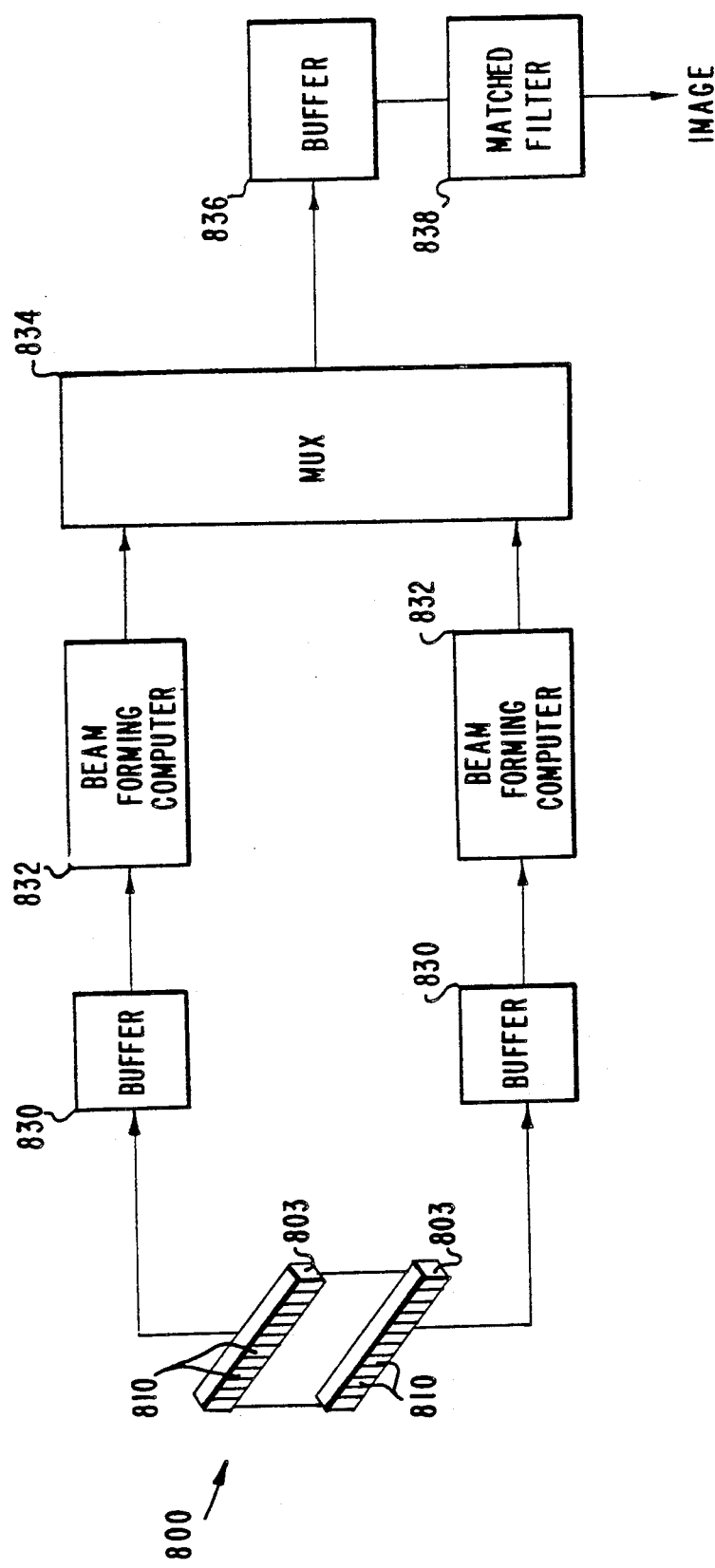

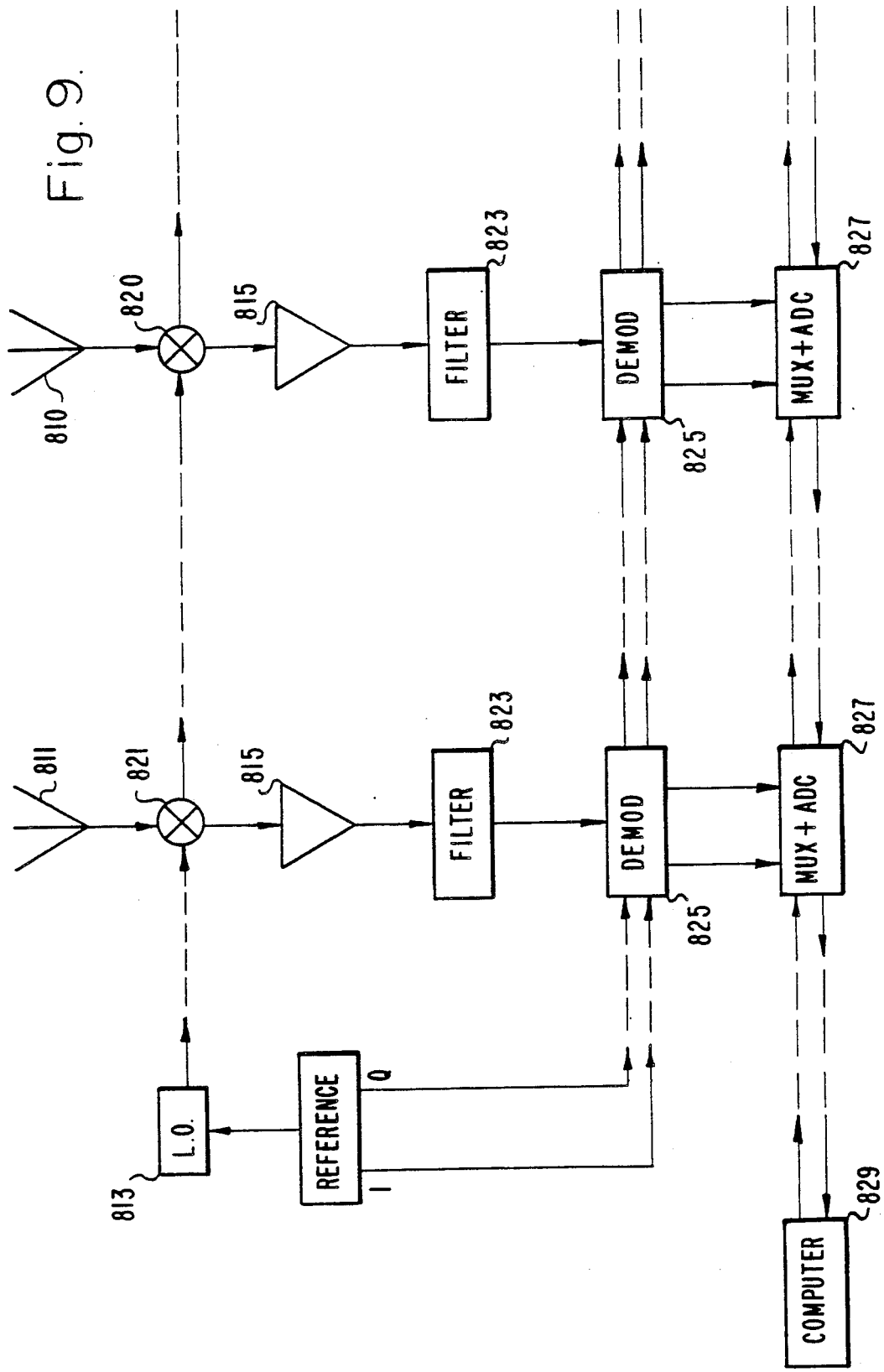

INTERFEROMETRIC RADIOMETER

BACKGROUND OF THE INVENTION

The present invention relates to radiometric imaging systems, and, more particularly, to a radiometer which determines the radiation distribution of a scene by scanning the scene with sensitivity lobes of an interferometer.

Radiometric imagers have many real and potential applications. Airborne and spaceborne microwave imagers can be used for: mapping terrestial, planetary and oceanographic features; measuring atmospheric water vapor, rain, and sea surface temperature; and assessing hydrographic phenomena, and meteorologic and surface conditions below clouds or rain.

By way of example, present geosynchronous satellite radiometric meteorological mappers are limited to visible and infrared frequencies which at best weakly penetrate cloud cover. Thus, present systems are precluded from providing continuous observation of the Earth's surface. Portions of the microwave spectrum (1 mm to 1 m wavelengths, herein) readily penetrates cloud cover. Therefore, a microwave radiometer could provide all-weather continuous imaging of the Earth's surface for meteorological and other applications.

Microwave radiometric imagers which use large parabolic dish reflectors are well known. The mass and size of the dishes are related to the angular resolution required and the wavelength to be received. To achieve the resolution required for the applications and wavelengths previously discussed requires very large and heavy structures. Accordingly, these reflectors are generally impractical for remote radio frequency applications.

Analogous problems of bulk and weight have been addressed in radar systems and the solutions have included synthetic aperture radar (SAR). However, the SAR systems are based on reflections of coherent radiation they produce. Radiometric systems are dependent on target emissions, and in general, these are broadband and incoherent.

What is needed is a practical radiometric imaging system which provides images of high resolution and fidelity relative to bulk and power requirements. It is further important that such a system be adaptable for satellite imaging from geosynchronous orbit.

SUMMARY OF THE INVENTION

An improved radiometer includes an interferometer and a transform means, such as a matched filter, for reconstructing the radio frequency, or other radiation, distribution of a scene from the interferometer output time record. The interferometer is characterized by a fringe pattern with a series of sensitivity lobes of varying width. The time record is produced by the interferometer as a series of the lobes scan the scene.

The radio frequency distribution of the scene along the direction of scan is reconstructed according to a function of a reference signature derivable from the scanning motion and the predetermined fringe pattern. In most applications, the signature is the time record that would result from a constant point emitter in the scene as the scene is scanned. Where the transform means includes a matched filter, the transform function may include a modulation transfer function equal to the complex conjugate of the Fourier transform of the signature.

It is necessary that the scene be scanned by plural sensitivity lobes, and appropriate scanning means are provided. The scanning motion may be provided by relative rotation or translation or both of the radiometer and the scene. More complex motions are accommodated by proper selection of the transfer function. In some applications, the scanning means may be inherent, —as in an earth-station interferometer used for star mapping.

The invention provides for substantially similar results by substantially equivalent means. For example, it is well known that convolution and cross-correlation can be performed in the time domain to produce the results of a modulation transfer function in the spatial frequency domain. Thus, in an alternative realization of the invention, the resultant is the correlation of the time record and the signature of the scanning motion. In either realization, the time record is collapsed into pulses ("spread functions") which individually represent pixel intensities and which collectively constitute the reconstructed scene.

The novel radiometer provides for reconstruction of the radio frequency distribution in the direction of scan. Two-dimensional distribution can be obtained by multiple scans or by supplementing a one-dimensional "along-track" scan with an alternative approach to resolving in the orthogonal "cross-track" direction. One alternative approach is to employ frequency or other fanbeam scanning antennas as elements of the interferometer. Transform functions are known which reconstruct the radiation distribution of a scene for these various realizations of the present invention.

The invention provides for reconstruction of the radiation distribution of multiple scenes which may be moving relative to each other, e.g. an aircraft flying over ground terrain. The multiple reconstructions result from multiple processing of the interferometer time record according to plural signatures, each signature characterizing the scan of an associated scene by the interferometer fringe pattern.

The varying width interferometer lobes can be viewed as a comb filter which successively accepts varying spatial frequencies of the scene as they are scanned. These spatial frequencies are formed by the constructive and destructive interference created by the variation of phase which occurs as a function of the angle of arrival of the received radio frequency energy.

BRIEF DESCRIPTION OF THE DRAWING

FIG. 3 is a signature characteristic of the counterclockwise scanning motion of the fringe pattern of FIG. 2.

FIG. 4 is the collapsed result of autocorrelation of the signature of FIG. 3.

FIG. 8 is a diagrammatic representation of a delay scanning radiometer in accordance with the present invention.

FIG. 9 is another diagrammatic representation of the radiometer of FIG. 8.

DESCRIPTION OF THE PREFERRED EMBODIMENTS

Figure 1:
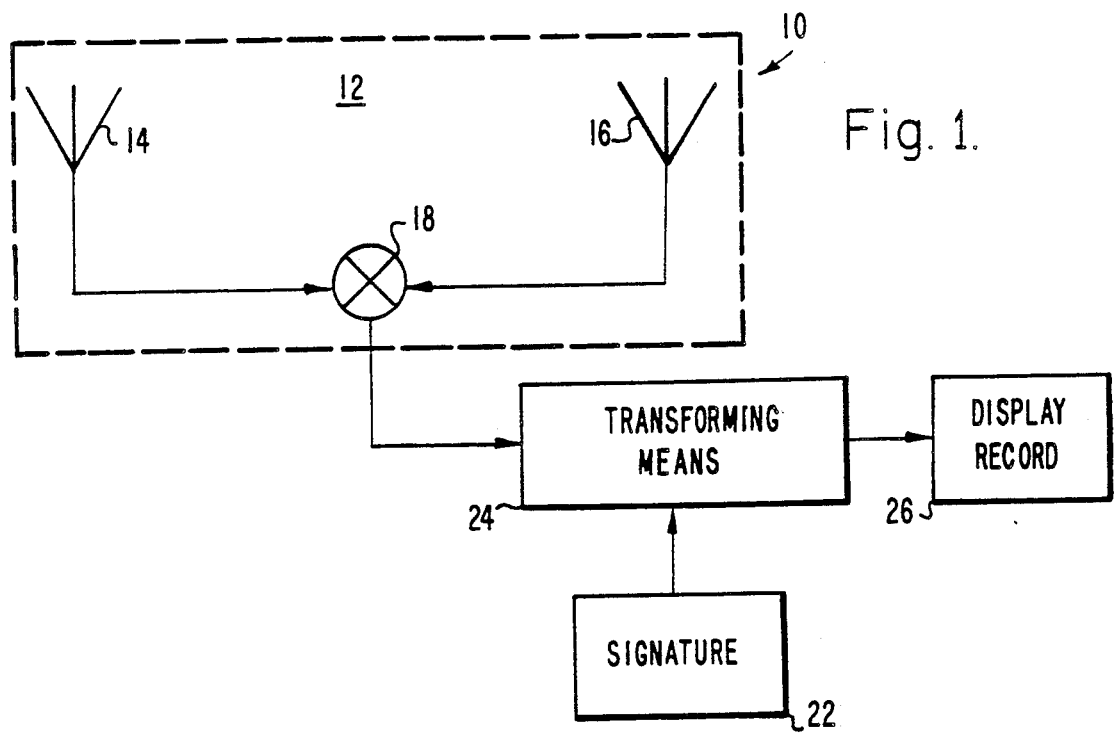
FIG. 1 is a diagrammatic view of a radiometer in accordance with the present invention.

In accordance with the present invention, a radiometer 10 includes an interferometer 12 and a transform means 24 for transforming the interferometer output, or "time record", into a representation of a radio frequency brightness distribution of a scene. The transform means 24 reconstructs the distribution from the interferometer time record, according to a function of a reference signature, indicated at 22, of the scanning motion relative to the fringe pattern. The signature is the time record which would result from the scanning of an impulse function by the interferometer fringe pattern. The time record is alternatively referred to as a "lobe history" due to its similarity to the Doppler history waveform produced by a synthetic aperture radar. The reconstructed distribution can be stored and/or displayed at 26.

In the illustrated embodiment, the transform means 24 is a matched filter with a modulation transfer function (MTF) equal to the complex conjugate of the Fourier transform of the signature to be characterized below. Alternatively, the transform function could involve cross-correlation or convolution.

The interferometer 12 includes two antennas 14 and 16 adapted for producing individual antenna time records in response to radio frequency emissions from a scene. The individual time records are combined by a multiplier 18, or other combining means, to produce an interferometer time record of amplitude or phase and amplitude, which becomes the input to the transform means 24.

Figure 2:
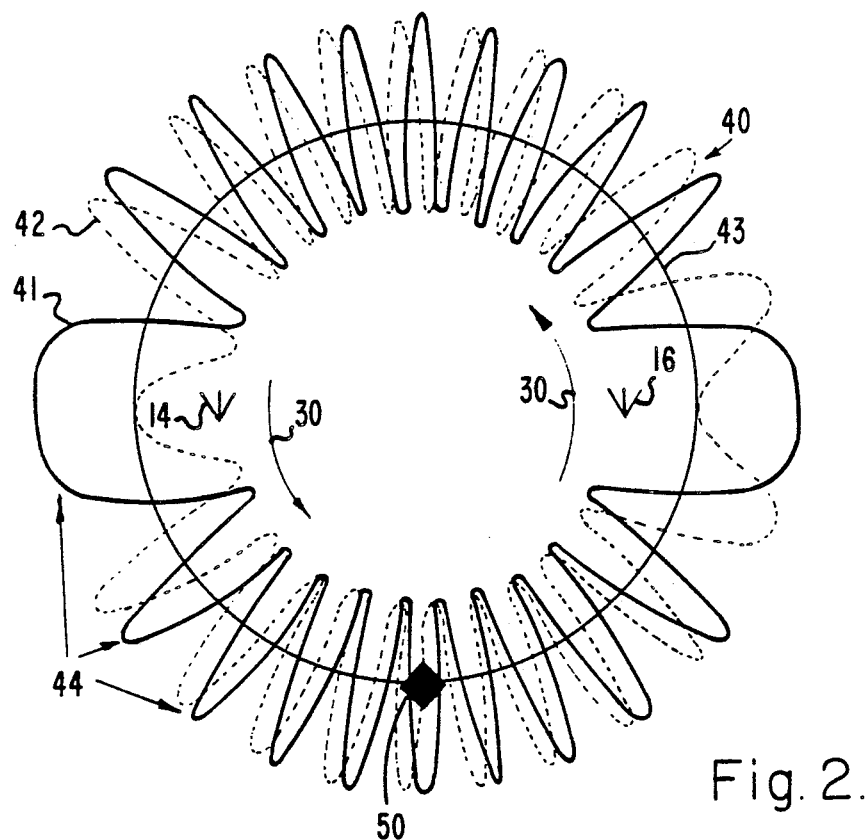
FIG. 2 is an fringe pattern of an interferometer incorporated in a radiometer in accordance with the present invention.

Shown in FIG. 2 is the fringe pattern 40 for the illustrated radiometer 10, which has a baseline of about five wavelengths of its center operating frequency. In order to preserve both phase and amplitude information, in-phase and quadrature detection can be used. The in-phase component 41 of the fringe pattern 40 is indicated by a solid curve, and the quadrature component 42 is shown as a broken curve. Note that the fringe pattern 41 and each of its components 41 and 42 comprise a series of sensitivity lobes 44 of varying width. A reference sensitivity level is indicated by a circle 43.

For the radiometer 10 to resolve the radio frequency distribution of the scene, there must be a relative movement of the scene and the interferometer fringe pattern along the interferometer baseline ("along-track direction"). Such a motion is represented by the arrows 30 which indicate rotational motion of the fringe pattern 40 relative to a reference point 50. The rotation is such that a series of the lobes 44 successively scan the reference point 50.

Assuming that reference point 50 is a constant emitter, rotation of the fringe pattern 40 at a constant angular velocity relative to reference point 50 produces a point signature 47 or time record shown in FIG. 3.

When, instead of scanning a single point, the radiometer 10 scans a two-dimensional scene of constant emitters in fixed physical relation to each other, each emitter in the scene produces a time record analogous to the point signature 47 shown in FIG. 3. The output of the interferometer 12 as it scans such a scene would be the sum of several such time records.

The amplitude of the oscillations of the time record of a point emitter varies according to the emitter's brightness as viewed from the interferometer elements. The pattern may be shifted in time (left or right as represented in FIG. 3) according to whether the point emitter is encountered "before or after" the reference point 50, assuming it were an element of the scene.

Given a stationary scene of constant point emitters and constant rate of rotation of fringe pattern 40, the time record output of the interferometer 12 is a superposition of similar waveforms of differing amplitude and time of occurrence. In fact, all the component waveforms are similar to the point signature of the hypothetical reference point 50 with allowance for position, brightness and extent.

It turns out that successive cross-correlations of the time record of a scene and a signature of the scanning motion permit resolution of the radio frequency brightness distribution of that scene along the direction of scan by collapse of the emitter time records into correctly located pulses, also known as "spread functions". The spread function 48 of the reference point 50, obtained by autocorrelation of its signature, is illustrated in FIG. 4.

Similarly, the radio frequency distribution of a scene can be obtained from the time record using mathematically equivalent transforms. Those well versed in the art of image reconstruction can recognize that correlational, convolutional and matched filtering approaches are applicable to provide theoretical identically, and practically similar, results. Note that no actual reference point emitter is required, since a signature is derivable from the fringe pattern and the relative motion of the fringe pattern and the scene.

It is not necessary for the entire fringe pattern to scan the scene. It is desirable for a given series of lobes to scan the entire scene. This ensures that all the scene emitters share a common waveform (except for timing and amplitude). Given a specific number of lobes, it is preferable to select a series of lobes with the greatest rate of change of lobe-width.

A given time record can be processed multiple times, each time with respect to a different signature. For example, by using reference signatures focused on different velocities, multiprocessing permits reconstruction of radio frequency distributions of multiple scenes which may be moving relative to each other from the perspective of the interferometer antenna. Such an approach would be used to obtain focused images of a plane and the terrain over which the plane is flying.

Signatures of simple rotational and translational motions are readily derivable. More complex relative motions of scene and fringe pattern can be accommodated provided the scene is scanned by plural lobes. However, some complex relative motions can require multiprocessing with respect to plural reference point signatures or with respect to signatures of more complex reference figures.

Generally, movement of the fringe pattern is accomplished by movement of the interferometer. However, relative movement of the scene and the fringe pattern can nominally involve movement of the scene alone. For example, a vehicle moving past a stationary interferometer pair. While, generally, movement of the fringe pattern implies movement of the interferometer, in some interferometers the fringe pattern can be electronically moved relative to the interferometer antenna structure, e.g. by use of variable phase or time delay devices. Hence, this description refers to relative motion of the fringe pattern and the scene.

Figure 5:
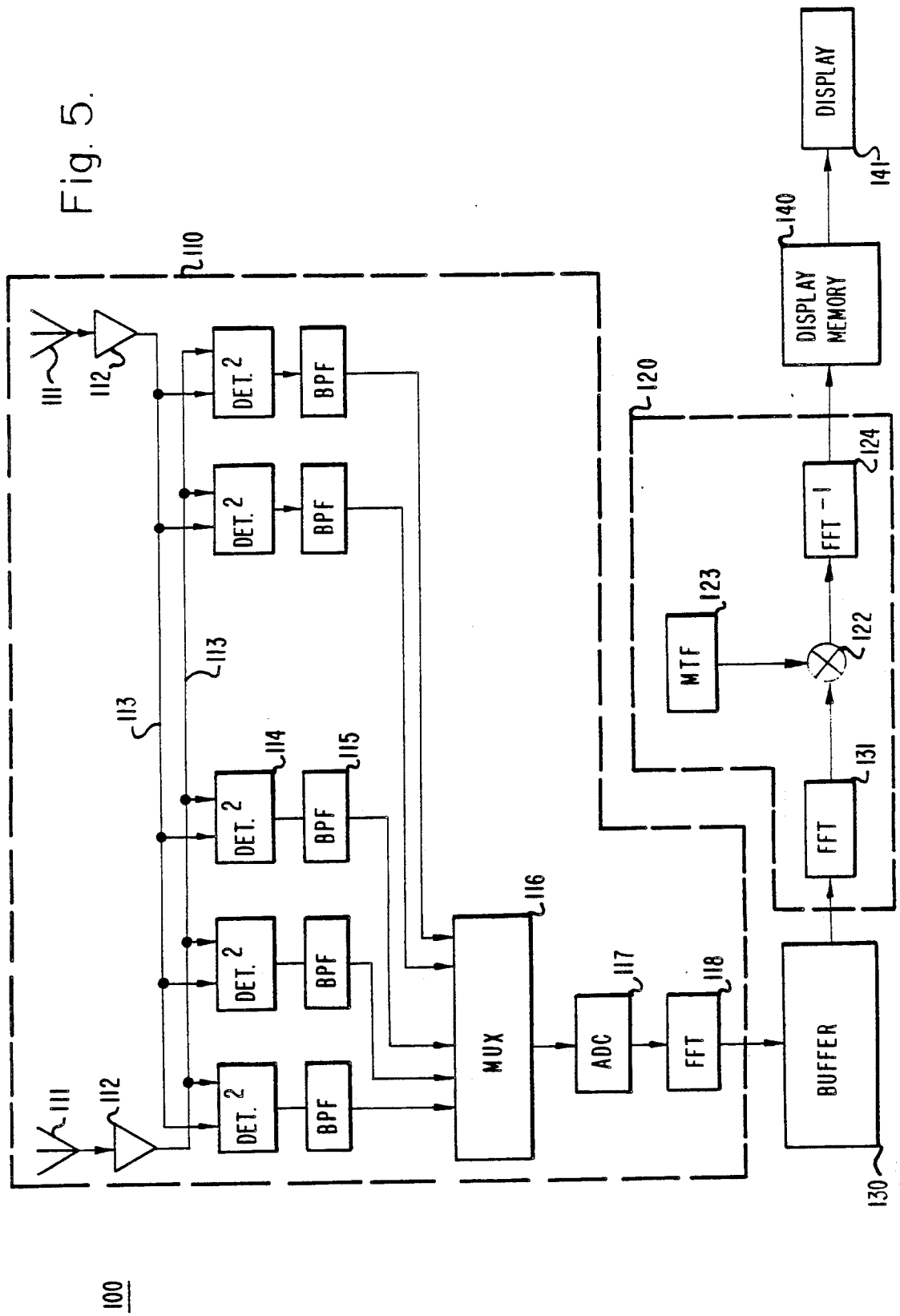
FIG. 5 is a diagrammatic representation of a second radiometer in accordance with the present invention.

A second radiometer 100, illustrated in FIG. 5, supplements the along-track resolution with cross-track resolution (orthogonal to the along-track resolution) to permit two-dimensional image reconstructions. The radiometer 100 includes an interferometer 110 coupled to a matched filter 120 via a memory or buffer 130. The result of the matched filter is stored in an image display memory 140 and displayed at 141.

The interferometer 110 includes a pair of frequency scanning fanbeam antennas 111 adapted for synchronously scanning a scene. The frequency scanning fanbeam antennas provide time records which include cross-track source direction data as a function of frequency. The antenna outputs may be amplified by FET amplifiers 112 and then divided along multiple-tap delay lines 113 to separate the time record components by cross-track direction.

In an alternative radiometer, a variable delay replaces the multiple-tap delay lines 113. This greatly reduces the computational power required for processing the time record with some loss of data throughput.

Corresponding cross-direction components are multiplied in parallel by square law detectors 114 coupled with bandpass filters 115 to eliminate DC and other unwanted signal components. The outputs of the bandpass filters 115 constitute a low frequency time record of the scene.

It should be noted that these bandpass filters 115 are not so narrow as to differentiate among the cross-track beam positions. The differentiation function is performed by the time delays. Thus, these bandpass filters 115 do not discard the information required for high-resolution imaging.

A multiplexer 116 combines the multiplied signals to form a single output which is digitized by an analog-to-digital converter (ADC) 117.

The ADC output is reconverted to the spatial domain by a fast Fourier transform 118 to form the interferometer time record. The buffer 130 is used to receive and temporarily store the interferometer time record. The buffer 130 permits the time record received in cross-track-direction coded segments to be converted to cross-track-direction data transmitted in time coded segments for transformation by matched filter 120.

The matched filter 120 includes a fast Fourier transform (FFT) means 121, a multiplier 122 and an inverse fast Fourier transform (FFT$^{-1}$) means 124. The FFT 121 converts the buffer 130 output into cross-track-direction data coded in spatial frequency segments.

The FFT 121 output is modified by a multiplier 122 with a modulation transfer function (MTF) indicated at 123. The modulation transfer function is the complex conjugate of the Fourier transform of the signature characterizing the movement of the scene relative to the given fringe pattern. Where the relative motion is predetermined, the modulation transfer function is stored in a ROM which is periodically accessed to process the modified time record. In an alternative embodiment, a set of MTF's to be selected is stored in a ROM. In another variation, a ROM includes the algorithm for determining the MTF from the associated signature which is provided by a relative motion sensor (not shown).

The transformed data is processed by the FFT$^{-1}$ 124 to yield along-track-direction coded segments of cross-track-direction data--which is the desired two-dimensional radio frequency distribution of the scene. The result is in the form of superpositioned pulses, or spread functions, of differing amplitudes, displaced with respect to time, and coded by fanbeam position. This result is stored in a display memory 140 for display at 141.

Figure 6:
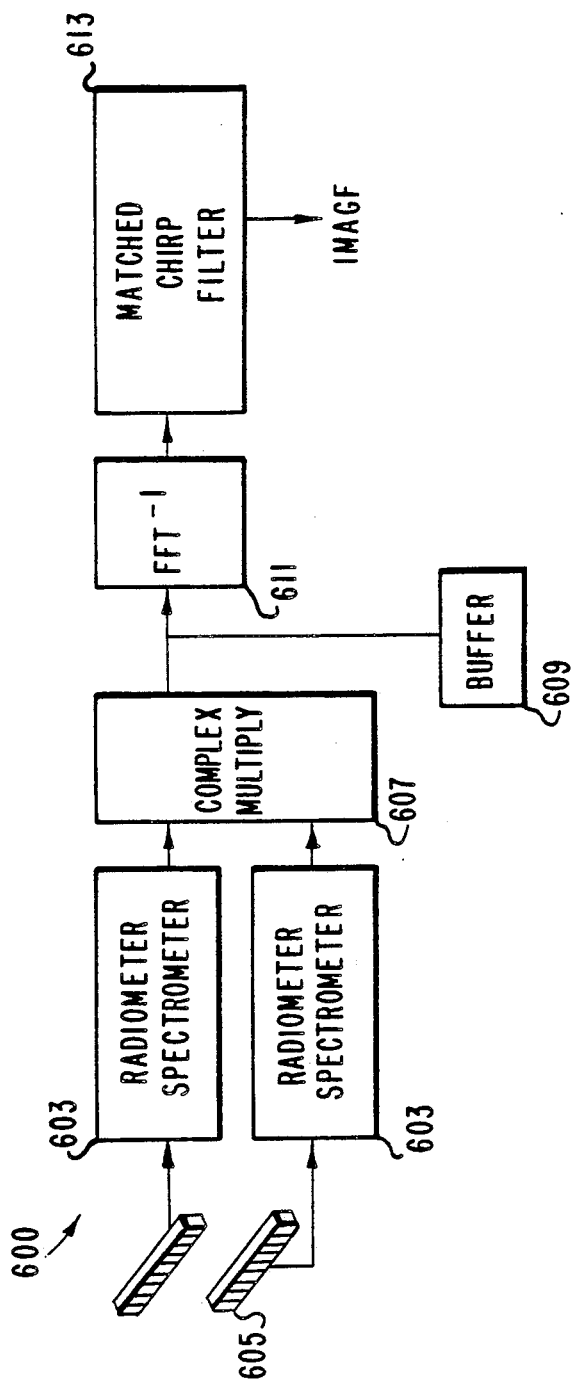
FIG. 6 is a diagrammatic representation of a third radiometer in accordance with the present invention.

Another radiometer 600 using a transform spectrometer 603 is shown in FIG. 6 for a spacecraft application. In rf and optical equipment, transform spectrometers have replaced filter bank spectrometers, which are heavy and bulky. Transform spectrometers depend upon a mathematical concept known as the Wiener-Khinchin Theorem, which states that the autocorrelation function of a function is the Fourier transform of the power spectrum of the function. Here the function in question is the time function of the output of the antenna. Taking the autocorrelation of this waveform, we obtain the Fourier transform of the power spectrum of that waveform. The power spectrum is a coded measure of the brightness of the scene as a function of scan angle. Thus, the autocorrelation of the signal out of the antenna is the Fourier transform of the scene. The antennas 605 are in orbit above the earth and are viewing the scene below. The outputs of the antennas 605 are passed through the pair of transform radiometer spectrometers 603 to separate the frequency scan or cross track dimension into parallel along track strips and then cross multiplied at 607 and buffered at 609. Since the data are in the form of Fourier transforms of the original scene data, a one dimensional inverse Fourier transformation is performed at 611. Next the signals are matched chirp filtered at 613 to separate or collapse the along track energy to form the map or image for each frequency scanned or along track strip in parallel. Each of these functions may be implemented as a one dimensional process because the two variables are separable. This process may be accomplished in an add-one-drop-one manner in the same way that SAR images are processed. The line of demarcation between the spaceborne and ground functions is chosen to minimize the downlink bandwidth.

Figure 7:
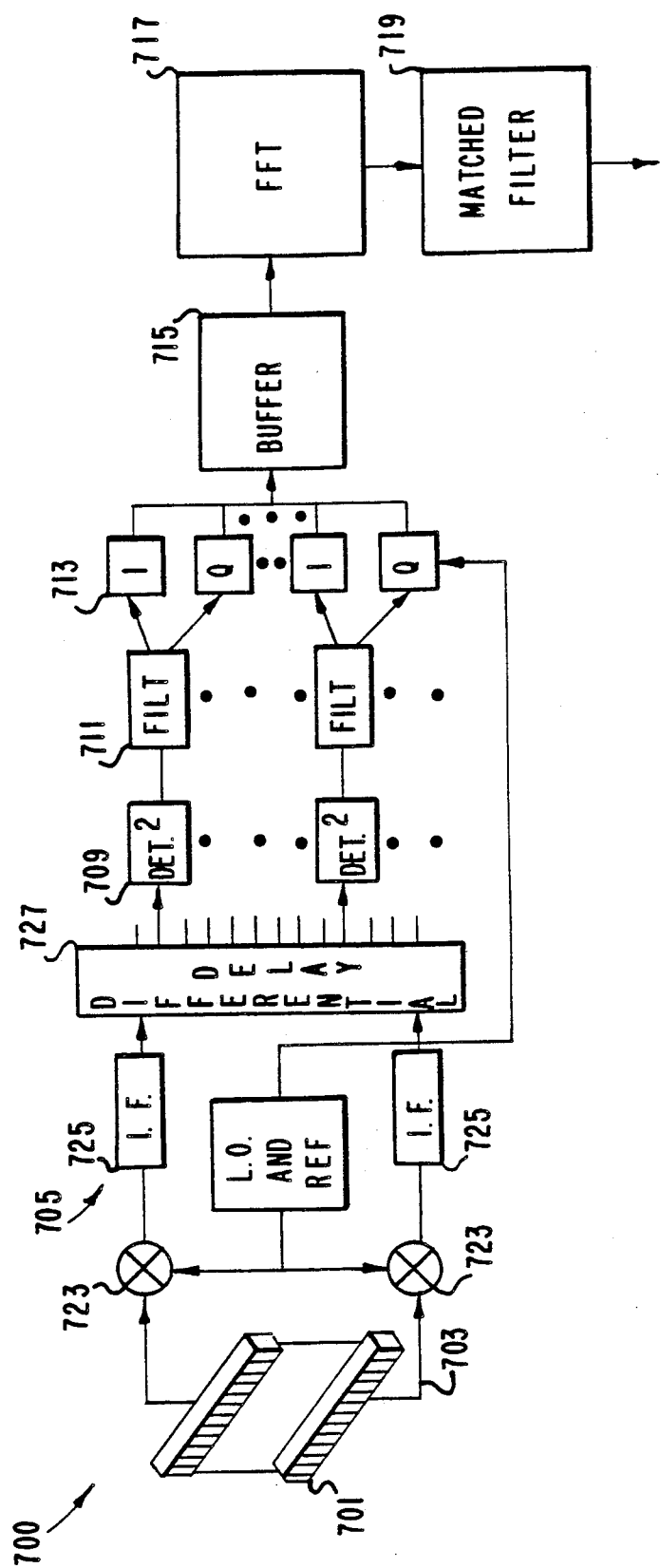
FIG. 7 is a diagrammatic representation of a fourth radiometer in accordance with the present invention.

In the radiometer 700 illustrated in FIG. 7, the signals received from the two frequency scan antennas 701 are fed to the two separate channels 703 of the correlation radiometer. The correlation radiometer used here is an AC offset correlation radiometer of the type described by Wesseling in the *IEEE Transactions on Antennas and Propagation*, Mar. 1967. The autocorrelator 705 which implements the transform spectrometer consists of a delay line 727 fed from both ends, in conjunction with the square law detectors 704 and filters 711. Each of the correlator outputs is synchronously demodulated at 713 to retain the phase in the I and Q demodulators. These demodulated signals are then digitized and a full frame of data is buffered in a ground computer or buffer 715 in an add-one-drop-one manner. At this time a one-dimensional inverse FFT 717 and a matched chirp filter 719 to reconstruct the image.

The concept of the correlation radiometer is based on the realization that the most efficient way to extract the thermal radiation noise received from the scene, which is the signal in a radiometer, from the instrument noise, which is the unwanted noise, is to make use of the fact that the "signal" noise will have the same time history in each of two (or more) antenna and amplification channels, while the corrupting instrument noise will not. The most effective way to accomplish this is obviously to use two separate antennas so that the thermal noise (generated by the fact that the antenna metal itself is not at absolute zero temperature) will not correlate as the signal does. The noises generated by the two separate antennas are uncorrelated because they are generated independently in the two separate pieces of metal. Thus, the correlation radiometer provides two independent channels for reception of the signal noise and then provides a means for correlating the two corrupted versions of the true signal together so that only the true signal remains. In essence, the noise sources in each separate channel do not contribute to the DC output of the system because they do not correlate. The simplest form of correlation is to adjust the two channels so that the total time delays in each are equal and then to multiply the two signals together. Hence, in more general terms the process is one of varying the time difference between two time varying functions, taking the product and integrating the result. The correlation radiometer described to this point could also be used with a pencil beam antenna to provide an excellent system.

The AC correlation system proposed here accomplishes this with a few slight variations. First an offset frequency is introduced in the local oscillator 721 used to heterodyne at 723 the two signals to a convenient intermediate frequency (indicated at 725) for most of the amplification. This is done to prevent the loss of the phase information which is part of the spatial frequency content of the signal. This is accomplished by synchronously demodulating the signal using the offset frequency as the reference. Since the demodulation is done with two references shifted by 90 degrees, the two resultant outputs contain the sine and cosine components from which the phase information can be recovered.

The capability to perform many correlations in parallel is provided to implement the transform spectrometer. This is done by using the delay line 727 with multiple taps whose relative time delays correspond to the differences in frequency between the fanbeams of the frequency scan antenna. The output of each tap provides a signal which is the sum of the signals from the two channels to be correlated. The signal pairs are input to square law detectors 709 which allow the use of the algebraic relationship $(a+b)^2 = a^2 + 2ab + b^2$. The $a^2$ and $b^2$ terms are DC terms which can easily be discarded by filters 711. This leaves the product term required for the autocorrelation process. The next step is to provide the integration which can be approximated to a high degree of accuracy by the same filter 711 which is used to remove the DC components. This is a band pass filter centered about the AC reference frequency used to offset the two i.f. channels. Next, the signals are synchronously demodulated with the offset frequency as the reference. The two resulting inphase and quadrature (I and Q) signals preserve the phase of the spatial frequency signals which are developed at this point because the autocorrelation has taken the Fourier transform of the input power spectrum by the Wiener-Khinchin Theorem. The set of I and Q signals out of each demodulator 713 are the set of Fourier transforms, spectra, or spatial frequencies and phases of the signals which have resulted from the parallel analog processing of the signals noise received from the entire scene.

At this point the data may be digitized in an A to D converter. In the spaceborne system this is the point where the signals can be buffered and transmitted to the ground station computer. This point in the process is chosen because the correlation process has given us the maximum bandwidth reduction at this point so that the minimum transmission bandwidth is required.

The next step in the process is to buffer (at 715) the information further so that a full scan of data is present. That is, all the data gathered from each image element must be present so that the lobe history matched filter 719 can collapse all this energy to a point in the final image. First, the data from each fanbeam of the antenna must be separated from every other fanbeam. This is accomplished by taking a one-dimensional Fourier transform (using a FFT algorithm) of the digitized data from each delay line tap. Each tap position corresponds to a certain autocorrelation time delay and thus, by the Wiener-Khinchin Theorem, to a certain frequency scan antenna fanbeam. Therefore the Fourier transform of the data in terms of time delay or tap position, is the measure of signal power along each fanbeam as it is moved by the spacecraft either in translation or rotation. Thus the successive Fourier transforms of the data as a function of time, form a set of parallel tracks of the scene data spaced at intervals in the cross-track direction.

The energy in each track is processed in parallel by the set of matched filter collapsing functions which correspond to the rate of change of lobe histories as defined by the antenna spacing and the frequencies. (It is interesting to note that the lobe histories of each fanbeam has a different rate because each one has a different radio frequency and wavelength. This means that each fanbeam achieves a somewhat different resolution which varies monotonically from one side of the swath to the other, with higher resolutions corresponding to the side which has the higher frequency fanbeams. This is analogous to the keystone effect which occurs in synthetic aperture radars because there the Doppler frequencies are higher for close targets and lower for more distant targets.)

After the energy from each fanbeam is collapsed, it represents the brightness temperature of the image pixel corresponding to that one fanbeam. The set of brightness temperatures for each fanbeam forms a set of pixels which define the image for one row in the cross track direction. This process of one-dimensional Fourier transform and matched filter collapsing function computations is repeated at a rate corresponding to the maximum resolution capability of the system and the platform velocity to avoid aliasing errors.

As these successive rows of scene pixel data are generated by the matched filter 719, they may be displayed in the form of a strip map which is continuously adding one new row and deleting the oldest row of data. At the same time the computer data buffer 715 is continually adding new input data for processing and deleting the oldest data after it has been used the last time. Again this is entirely analogous to the process used in a SAR. Of course, the strip map data may be recorded to provide a continuous map if this is desired.

The radiometer 800 illustrated in FIG. 8 uses linesource antennas 803, each comprising a set of discrete antenna elements 810 and receivers (not shown) which maintain phase coherency, interconnected to form a multiplicity of beams after detection, in the same way that sonar transducer systems work. The individual antenna elements 810 may be crossed dipoles or any other suitable type of element such as will be apparent to those well versed in the art. Behind each antenna element 810 is a receiver on a chip.

The outputs of the sets of antenna elements 810 are temporarily stored in respective buffers 830. The collected data is then processed by a beam forming computer 832, as in some sonar devices. A multiplexer 834 sends the processed data along a single path for storage in buffer 836. The data collected is then formed into image data by matched filter 838.

The specifics of the discrete antenna implementation are shown in more detail in FIG. 9. This is a block diagram of one of the discrete radiometer antennas 803 with a central local oscillator and controller 813 and two of the multiplicity of antenna-amplifier units 810, 811. One antenna element 811 is designated as the reference. The signal is received by all of the antenna elements but it is received at times which differ sequentially along the line array by a factor proportional to the sine of the angle of arrival times the element spacing.

The angle of arrival in the cross track direction can be determined by measuring the time difference between reception at adjacent elements 810. Typically, the radiometer signal is many times weaker than the random noise of the instrument on an instantaneous time basis. The natural background radiation can be recovered only after performing a signal integration for a time period long enough to bring the signal noise up to a level higher than the instrument noise.

The beam forming technique, analogous to that used in sonar, works by digitizing the signals and noise present at each antenna element 810 before detection, and then, in a digital computer 829, inserting the time delays required to form a set of beams in each cross track direction. Since the processing takes place on a set of digital words, no loss of sensitivity is encountered in repeating the signal among a large number of beam bins and the implementation of the large number of beams does not require a large amount of equipment. (A description of the approach used in the field of sonar data processing is contained in the tutorial article "Digital Signal Processing for Sonar", by Knight et al., in the November 1981 *Proceedings of the IEEE*.)

In the implementation shown in FIG. 9, the signal from each antenna element 810, 811 is amplified and detected in an integral antenna-amplifier unit 815. The local oscillator signal applied to the mixer 821 in the reference channel is displaced slightly from the local oscillator signals applied to all of the other mixers 820. Each signal is heterodyned down to a convenient i.f. for the amplification process. The signal filters 823 serve to define the bandpass of the receiver. A reference signal consistent with the i.f. is used as the input to synchronous demodulators 825. The i.f. signals are then digitized and multiplexed at devices 827 before detection (to preserve i.f. phase) and transmitted in this digital form to the central computer 829. Of course, the computer can be located on board the vehicle or on the ground, depending on the application. At this point a set of digital words represent the signals and noises received in each antenna element 810, 811. The computer 829 shifts the words in parallel to apply the time delays which are necessary to form the beams in all desired cross track directions. The next step is to perform the autocor-relation between shifted signal pairs formed by combining the reference signal with each of the other signals. Because of the frequency difference between the local oscillator signal applied to the reference channel mixer 821 and all the other mixers 820, there is an AC beat note present in each signal pair. Signals not at this beat frequency are filtered out. Of course, the signals which are at any other frequency, including zero frequency or DC, are really the unwanted noise introduced by the non-zero temperature of the antenna and the noise figures of the amplifiers and mixers. At this point the set of individual fanbeams are formed by adding the correlated signal pairs. Each pair is time shifted the required amount so that when added their equivalent energies sum vectorially only over the range of angles which correspond to the width of the narrow fanbeam.

The higher data rate can be reduced by several methods if required. One of these methods is to perform the cross correlation between delayed signals in the on board computer. After the correlation, the data rate is greatly reduced. Another way to accomplished this is to perform the cross correlation directly on the i.f. signals, either before or after digitization, and then to filter and synchronously demodulate to obtain I and Q signals. Of course, this latter approach would introduce some time delay decorrelation if phase shifters rather than true time delay devices were used.

From this point on the system is identical to the frequency scan system. Having the data from each fanbeam in the cross track direction, we can store this information in a buffer and then process each fanbeam signal by matched filtering to collapse the energy from each scene element along the track to form a measure of the brightness in each pixel. As each row of information is formed it can be displayed in an add-one-drop-one manner or recorded to form a strip map. The buffer memory is also used in an add-one-drop-one manner.

Other embodiments are provided by the present invention. The mathematical algorithms can be modified, rearranged and translated into the physical realm in many ways. Each realization introduces its own deviance from the suggested mathematical algorithms. In addition, many forms of relative motion can be accommodated. Appropriate selection of signatures permits focused determination of the radio frequency distribution of multiple scenes and complex scanning motions.

An active radar system is also provided, making use of a flood beam to illuminate the scene. With this embodiment, much greater sensitivity and shorter imaging and integration times are possible. Extremely low power transmitters using broad band or noise modulated signals can retain a degree of silence. Range gating in conjunction with the two-dimensional embodiments allow three dimensional images to be made.

In the case of two-dimensional imaging, the cross track scanning may be mechanical or electronic. In addition to frequency scanning, electronic scanning may be true time delay or phase shift scanning. Note that electronically scanned fanbeams tend to be conical. In the case where the relative motion of fringe pattern and scene is translational rather than rotational, lobe-walk problems, analogous to range-walk in RADAR, arise and are soluble in analogous ways by those skilled in the art. These and other modifications and alternatives to the described embodiments are within the scope of the present invention.

What is claimed is:

1. A radiometer for reconstructing the radiation distribution of a scene of noncoherent multiple emitters comprising:
   an interferometer further comprising; first and second antennas, each of the antennas producing individual time records in response to radio frequency emissions from the scene and means coupled to the first and second antennas for combining the individual time records to produce an interferemeter time record of the scene, said interferometer also having a predetermined fringe pattern with a series of sensitivity lobes with different widths;

scanning means for effecting determinable relative movement between said fringe pattern and said scene so that a predetermined plurality of said lobes scan said scene;

signature means for providing a signature of said determinable scanning motion relative to said predetermined fringe pattern; and transform means for reconstructing said distribution from said interferometer time record according to a function of said signature, said function being selected so that its resultant is a reconstruction of the radiation distribution of said scene.

2. The radiometer of claim 1 further characterized in that said interferometer time record is a superposition of the time records of said emitters and in that said transform means collapses said time records into pulses, said pulses forming said reconstruction of said scene.

3. The radiometer of claim 1 further characterized in that said transform means is a matched filter having a modulation transfer function equal to the complex conjugate of the Fourier transform of said signature.

4. The radiometer of claim 1 further characterized in that said transform means involves correlation of the time record and said signature.

5. The radiometer of claim 1 further characterized in that said scanning means is adapted for effecting relative rotational movement of said fringe pattern and said scene.

6. The radiometer of claim 1 further characterized in that said scanning means is adapted for effecting relative translational movement of said fringe pattern and said scene.

7. The radiometer of claim 1 further characterized in that said signature means is adapted for providing multiple signatures, said transform means multi-processing said time record according to said plural signatures so as to reconstruct the radiation distribution of concurrent scenes moving relative to each other.

8. The radiometer of claim 1 further comprising means for resolving radio frequency distribution in a direction orthogonal to said scanning motion so that said resultant is a two-dimensional representation of the radiation distribution of said scene.

9. The radiometer of claim 8 further characterized in that said scanning means provides for multiple scans of said scene along plural rotational directions, and in that said transform means includes means for reconstructing a two-dimensional representation of the radio frequency distribution of said scene from the time records of multiple scans of said scene along plural rotational directions.

10. The radiometer of claim 1 further characterized in that said interferometer includes plural fanbeam antennas adapted for synchronously scanning said scene so that components of said time record are coded according to fanbeam position, said transform means providing an at least two-dimensional representation of the radiation distribution of said scene.

11. A radiometer for reconstructing the radiation distribution of a scene of a noncoherent emitters comprising:

an interferometer further comprising first and second antenna means for producing individual time records in response to radio frequency emission of the scene; and means coupled to the first and second antennas for combining the individual time records to produce an amplitude time record, the combining means also producing a predetermined fringe pattern with a series of sensitivity lobes with different widths;

means coupled to the combining means for transforming the amplitude time record; and means coupled to the transforming means for providing a reference signature thereto, the transforming means for reconstructing the radiation distribution of the scene from the amplitude time record as a function of the reference signature.

12. A radiometer for reconstructing the radiation distribution of a scene of noncoherent multiple emitters comprising:

an interferometer for generating a time record in response to said scene, said interferometer having a predetermined fringe pattern with a series of sensitivity lobes with different widths;

scanning means for effecting determinable relative movement between said fringe pattern and said scene so that a predetermined plurality of said lobes scan said scene;

signature means for providing a signature of said determinable scanning motion relative to said predetermined fringe pattern; and said signature means is adapted for providing multiple signatures, transform means for reconstructing said distribution from said time record according to a function of said signature, said function being selected so that its resultant is a reconstruction of the radiation distribution of said scene.

13. A radiometer for reconstructing the radiation distribution of a scene of noncoherent multiple emitters comprising:

an interferometer for generating a time record in response to said scene, said interferometer having a predetermined fringe pattern with a series of sensitivity lobes with different widths;

scanning means for effecting determinable relative movement between said fringe pattern and said scene so that a predetermined plurality of said lobes scan said scene, said scanning means provides for multiple scans of said scenes along plural rotational directions signature means for providing a signature of said determinable scanning motion relative to said predetermined fringe pattern;

transform means for reconstructing said distribution from said time record according to a function of said signature, said function being selected so that its resultant is a reconstruction of the radiation distribution of said scene; said transform means includes means for reconstructing a two-dimensional representation of the radio frequency distribution of said scene from the times of multiple scans of said scene along plural rotational directions; and means for resolving radio-frequency distribution in a direction that is orthogonal to said scanning motion so that the resultant is a two dimensional representation of the radiation distribution of the scene.

* * * * *